(12) United States Patent
Duhaime et al.

(10) Patent No.: US 7,934,590 B2
(45) Date of Patent: May 3, 2011

(54) PARK-BY-WIRE SUBSYSTEM FOR A CONTROL SYSTEM FOR AN ELECTRICALLY VARIABLE HYBRID TRANSMISSION

(75) Inventors: Michael L. Duhaime, Northville, MI (US); Mark A. Vernacchia, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1000 days.

(21) Appl. No.: 11/759,010

(22) Filed: Jun. 6, 2007

(65) Prior Publication Data

US 2007/0284213 A1 Dec. 13, 2007

Related U.S. Application Data

(60) Provisional application No. 60/811,656, filed on Jun. 7, 2006.

(51) Int. Cl.
*B60W 10/18* (2006.01)
(52) U.S. Cl. .................................................. 192/219.5
(58) Field of Classification Search ............... 192/219.4, 192/219.5, 30 W; 477/189, 196
See application file for complete search history.

(56) References Cited

U.S. PATENT DOCUMENTS

| | | | | |
|---|---|---|---|---|
| 5,931,757 | A * | 8/1999 | Schmidt | 475/2 |
| 7,490,528 | B2 * | 2/2009 | Koski et al. | 74/336 R |
| 7,493,999 | B2 | 2/2009 | Reed et al. | |
| 2002/0084149 | A1 | 7/2002 | Heuver | |
| 2002/0084162 | A1 * | 7/2002 | Schafer et al. | 192/13 A |

FOREIGN PATENT DOCUMENTS

| | | |
|---|---|---|
| CN | 1702355 A | 11/2005 |
| DE | 3537091 C1 | 4/1987 |
| DE | 4415133 C1 | 6/1995 |
| DE | 19529665 A1 | 2/1997 |
| DE | 19604957 A1 | 8/1997 |
| EP | 1113194 A1 | 7/2001 |
| EP | 1113195 A1 | 7/2001 |

\* cited by examiner

*Primary Examiner* — Edwin A Young
(74) *Attorney, Agent, or Firm* — Quinn Law Group, PLLC

(57) ABSTRACT

A park-by-wire subsystem which is internally mounted within an electrically variable hybrid transmission is provided. The park-by-wire subsystem provides a means of selectively placing the electrically variable hybrid transmission in a park condition by the selective actuation of an actuator operatively connected to a lever. The lever enables selective engagement of a park pawl mechanism and incorporates multiple Hall effect switches to monitor the position of the lever. The subsystem is monitored by various switches and sensors to provide control and diagnostic feedback and is activated by a command source controlled by a first control unit. A second control unit is incorporated into the design for required control, monitoring, and diagnostic redundancies.

15 Claims, 10 Drawing Sheets

PARK-BY-WIRE SUBSYSTEM FOR A CONTROL SYSTEM FOR AN ELECTRICALLY VARIABLE HYBRID TRANSMISSION

CROSS REFERENCE TO RELATED APPLICATIONS

This application claims priority to U.S. Provisional Patent Application No. 60/811,656, filed on Jun. 7, 2006, which is hereby incorporated by reference in its entirety.

TECHNICAL FIELD

The present invention relates to electro-hydraulic control systems for electrically variable hybrid transmissions.

BACKGROUND OF THE INVENTION

Multi-speed power transmissions, particularly those using planetary gear arrangements, require a hydraulic system to provide controlled engagement and disengagement, on a desired schedule, of the clutches and brakes or torque transmitting mechanisms that operate to establish the ratios within the planetary gear arrangement.

These control systems have evolved from substantially pure hydraulic control systems, wherein hydraulic devices, produce all of the control signals to electro-hydraulic control systems, wherein an electronic control unit produces a number of the control signals. The electronic control unit emits electrical control signals to solenoid valves, which then issue controlled hydraulic signals to the various operating valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieves the hydraulic control system from providing for the control of overlap between the torque transmitting mechanism that was coming on and the torque transmitting mechanism that was going off. If this overlap is excessive, the driver feels a shudder in the drivetrain, and if the overlap is too little, the driver experiences engine flare or a sense of coasting. The freewheel device prevents this feeling by quickly engaging when the torque imposed thereon is reversed from a freewheeling state to a transmitting state.

The advent of electro-hydraulic devices gave rise to what is known as clutch-to-clutch shift arrangements to reduce the complexity of the transmission and the control. These electro-hydraulic control mechanisms are generally perceived to reduce cost and reduce the space required for the control mechanism.

In addition, with the advent of more sophisticated control mechanisms, the power transmissions have advanced from two-speed or three-speed transmissions to five-speed and six-speed transmissions. The torque capacity of a torque transmitting mechanism (on-coming or off-going) involved in a shift may be conveniently controlled by the combination of an electrically activated solenoid valve and a pressure regulator valve or trim valve. In a typical system, the solenoid valve is activated by pulse-width-modulation (PWM) at a controlled duty cycle to develop a pilot pressure for the pressure regulator valve or trim valve, which in turn, supplies fluid pressure to the torque transmitting mechanisms in proportion to the solenoid duty cycle.

Additionally, an electrically variable hybrid transmission has been proposed to improve fuel economy and reduce exhaust emissions. The electrically variable hybrid transmission splits mechanical power between an input shaft and an output shaft into a mechanical power path and an electrical power path by means of differential gearing. The mechanical power path may include clutches and additional gears. The electrical power path may employ two electrical power units, or motor/generator assemblies, each of which may operate as a motor or a generator. With an electrical storage system, such as a battery, the electrically variable hybrid transmission can be incorporated into a propulsion system for a hybrid electric vehicle.

The hybrid propulsion system uses an electrical power source as well as an engine power source. The electrical power source is connected with the motor/generator units through an electronic control unit, which distributes the electrical power as required. The electronic control unit also has connections with the engine and vehicle to determine the operating characteristics, or operating demand, so that the motor/generator assemblies are operated properly as either a motor or a generator. When operating as a generator, the motor/generator assembly accepts power from either the vehicle or the engine and stores power in the battery, or provides that power to operate another electrical device or another motor/generator assembly.

There are two main hybrid vehicle architectures—the parallel hybrid and the series hybrid. The hybrid electric vehicle with a parallel configuration has a direct mechanical connection between the hybrid propulsion system and the drive wheels of the vehicle. In contrast, the hybrid electric vehicle with a series configuration uses an engine mounted generator to produce electricity for the batteries and/or the electric motor. The series hybrid electric vehicle has no mechanical connection between the hybrid propulsion system and the drive wheels. Some hybrid propulsion systems may selectively operate in either a parallel or a series configuration by employing a clutching mechanism, such as a dog clutch.

Additionally, modern control systems allow "shift by wire" range shift capability. Another name for this technology is electronic transmission range selection, or ETRS. The ETRS systems dispense with much of the mechanical interconnections found in mechanically actuated transmissions, thereby simplifying the transmission architecture and internal mechanical shifter designs. The additional functionality provided by an electrically variable hybrid transmission requires creative methods of control architecture to reduce cost, complexity, and weight, while increasing reliability.

SUMMARY OF THE INVENTION

An internally mounted park-by-wire subsystem for an electrically variable hybrid transmission is provided. The park-by-wire subsystem includes a command source and an actuator responsive to control from the command source. A lever is operatively connected to the actuator, while a park pawl mechanism is operatively connected to the lever. The actuator is operable to engage the lever to selectively place the park pawl mechanism in one of a park and out-of-park condition. First and second control units are operable to communicate with each other. The first control unit is operable to control the command source. A switch is operable to monitor the command source and communicate with the first control unit. Additionally, a sensor is operable to monitor the actuator and communicate with the second control unit. First and second Hall effect switches are also provided. The first Hall effect switch is operable to signal the position of the lever to the first control unit and the second Hall effect switch is operable to signal the position of the lever to the second control unit. A latching solenoid is operable to maintain the park pawl mechanism in the out-of-park condition in the absence of control from the command source. An electrically variable hybrid transmission incorporating the disclosed park-by-wire subsystem is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
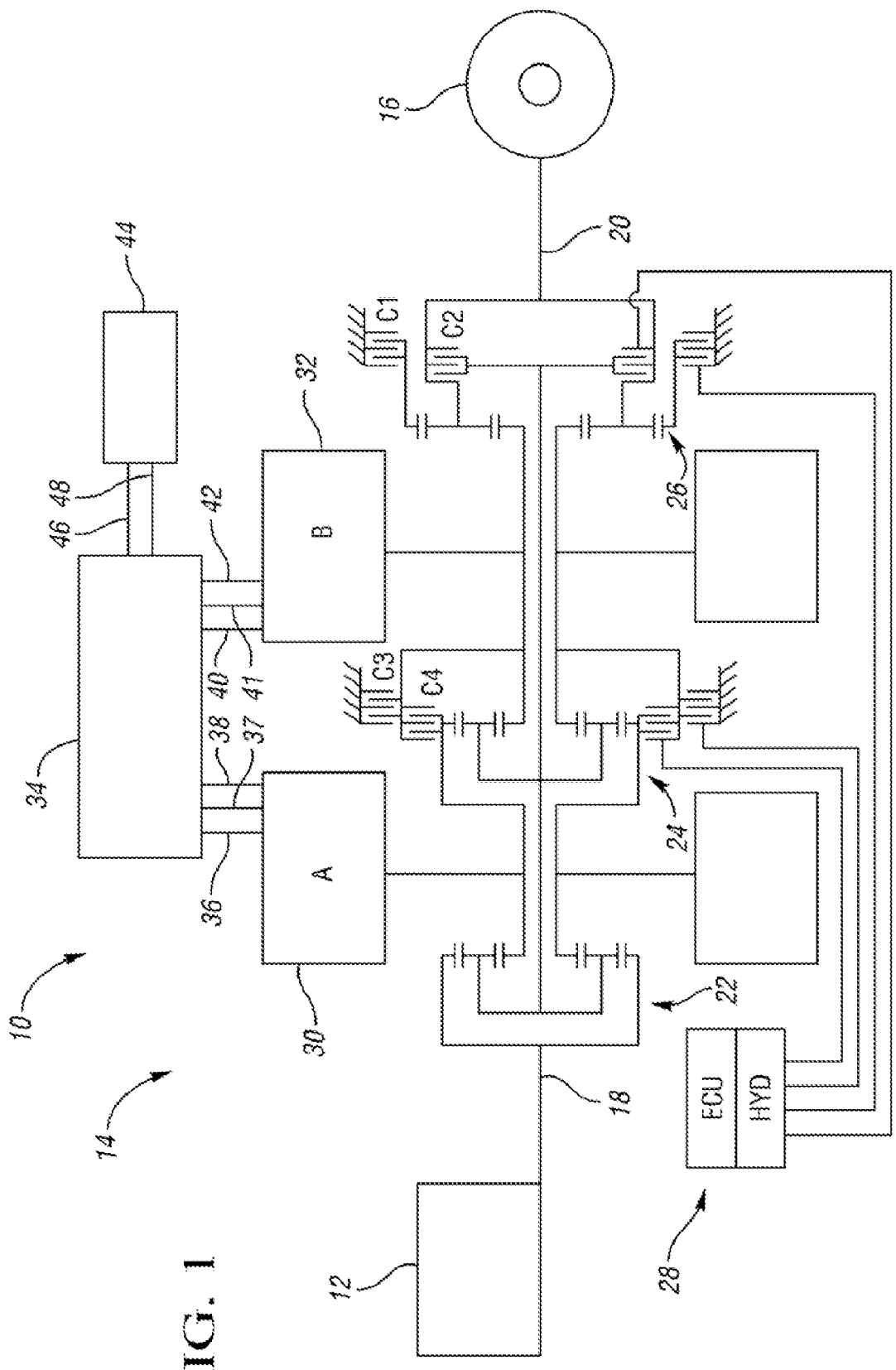
FIG. 1 is a schematic representation of a electrically variable hybrid vehicular powertrain for use with the present invention.

Referring to the drawings wherein like characters represent the same or corresponding parts throughout the several views, there is seen in FIG. 1 a powertrain 10 having an engine 12, an electrically variable hybrid transmission 14, and a conventional final drive 16.

Figure 2A:
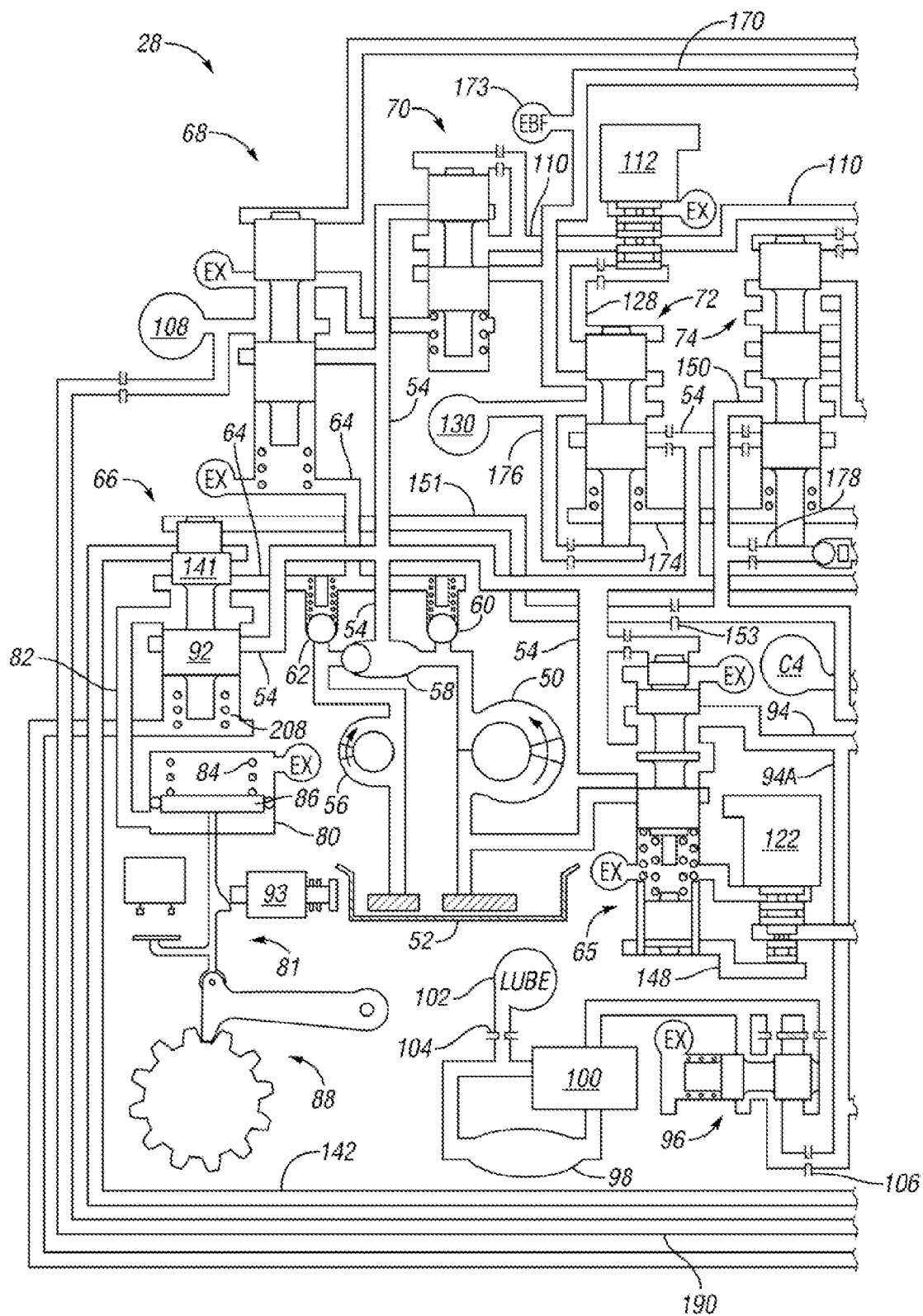
FIGS. 2a and 2b, taken together, is a schematic representation describing the electro-hydraulic control system utilized with the powertrain of FIG. 1, depicting the control system in an electrical power ON, park/neutral mode of operation.
Figure 2B:
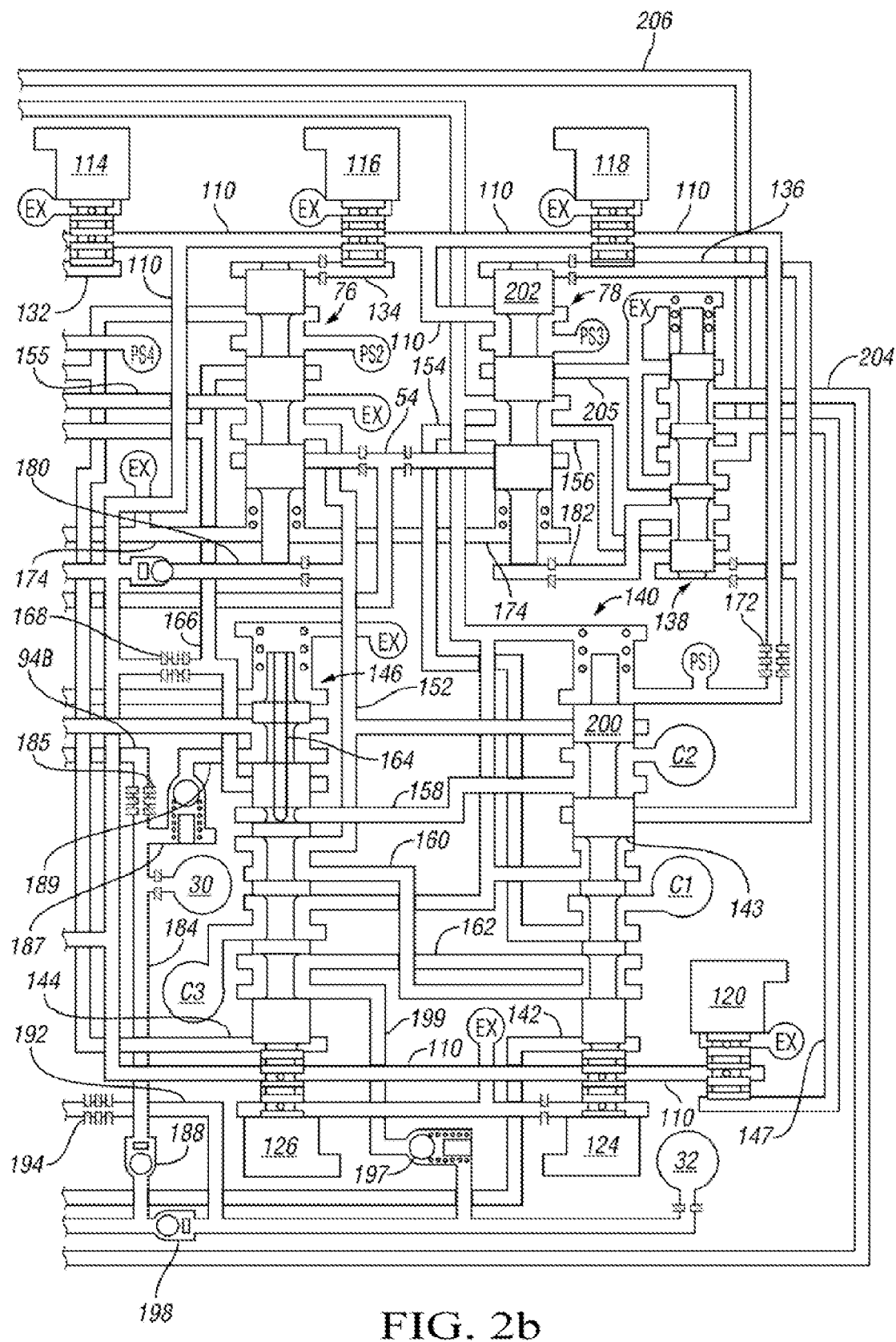

The engine 12 is a conventional internal combustion engine. The electrically variable hybrid transmission 14 includes a planetary gear arrangement having an input shaft 18, an output shaft 20, three planetary gearsets 22, 24, and 26, four torque transmitting mechanisms C1, C2, C3, and C4, and an electro-hydraulic control system 28. The torque transmitting mechanisms C2 and C4 are fluid-operated rotating clutch-type devices, while the torque transmitting mechanisms C1 and C3 are fluid-operated stationary clutch or brake devices. The selective engagement and disengagement of the torque transmitting devices is controlled by an electro-hydraulic control system 28, which is shown in FIGS. 2a and 2b.

Further incorporated into the electrically variable hybrid transmission 14 is a pair of electrical power units or motor/generators 30 or (A) and 32 or (B) that are controlled by an electronic control unit 34. The electronic control unit 34 is connected with the electrical power unit 30 through three electrical conductors 36, 37, and 38, and is connected with the electrical power unit 32 through three electrical conductors 40, 41, and 42. The electronic control unit 34 is also in electrical communication with an electrical storage device 44, which is connected with the electronic control unit 34 through a pair of electrical conductors 46 and 48. The electrical storage device 44 is generally one or more electrical batteries.

The electrical power units 30 and 32 are preferably motor/generator units, which can operate as a power supplier or as a power generator. When operating as a motor or power supplier, the electrical power units 30 and 32 will supply power to the electrically variable hybrid transmission 14. When operating as generators, one of the electrical power units 30 and 32 will take electrical power from the transmission 14, and the electronic control unit 34 will either distribute the power to the electrical storage device 44 or distribute the power to the other one of the power units 30 and 32, which will be operating as a motor at that time.

The electronic control unit 34 receives a number of electrical signals from the vehicle and transmission 14, such as engine speed, throttle demand, vehicle speed, to name a few. These electrical signals are used as input signals for a programmable digital computer, which is incorporated within the electronic control unit 34. The computer is then effective to distribute the electrical power as required to permit the operation of the electrically variable hybrid transmission 14 in a controlled manner.

The planetary gear arrangement, as shown in FIG. 1, provides four forward speed ratios or ranges between the input shaft 18 and the output shaft 20. In the first forward range, the torque transmitting mechanisms C1 and C4 are engaged. In the second forward range, the torque transmitting mechanisms C1 and C2 are engaged. In the third forward range, the torque transmitting mechanisms C2 and C4 are engaged. In the fourth forward range, the torque transmitting mechanisms C2 and C3 are engaged. The gearing also provides a neutral condition when the torque transmitting mechanisms C1, C2, C3 and C4 are disengaged. An electrically variable low mode of operation is provided wherein the torque transmitting mechanism C1 is engaged, and an electrically variable high mode of operation is provided wherein the torque transmitting mechanism C2 is engaged.

The powertrain 10 may also operate in a purely electric mode. The engine off, electric low speed mode of operation is facilitated by engaging the C1 torque transmitting mechanism. The powertrain 10 has two speed ranges of drive-home capabilities within the electrically variable hybrid transmission 14 in the event that the electro-hydraulic control system 28 undergoes a malfunction or discontinuance of electrical power. In the electrical power off drive home modes, the electro-hydraulic control system 28 defaults to an electrically variable low mode of operation wherein the torque transmitting mechanism C1 is engaged, and an electrically variable high mode of operation wherein the torque transmitting mechanism C2 is engaged. The electrically variable hybrid transmission 14 is capable of operating in a parallel and series reverse mode of operation. In the parallel reverse mode, the electrically variable hybrid transmission 14 operates in an electrically variable low mode of operation wherein the torque transmitting mechanism C1 is engaged. Alternately, in the series reverse mode, the torque transmitting mechanisms C1 and C4 are engaged while a dog clutch is disengaged.

The electro-hydraulic control system 28 includes an electronic control unit (ECU) and a hydraulic control unit (HYD). The ECU incorporates a digital computer that is programmable to provide electrical signals to the hydraulic portion of the electro-hydraulic control system 28 to establish the engagement and disengagement of the torque transmitting mechanisms C1, C2, C3, and C4. FIGS. 2a through 3b show the electro-hydraulic control system 28 in detail. As shown in FIGS. 2a through 3b, the hydraulic portion of the electro-hydraulic control system 28 includes an engine driven hydraulic pump 50, such as a fixed displacement pump, that draws fluid from the reservoir 52 for delivery to a main passage 54. Alternately, an electrically controlled hydraulic pump 56 is provided for operation in the electric mode. A check valve 58 operates to selectively distribute pressurized fluid to the main passage 54 depending upon which pump 50 or 56 is operating. A pressure relief valve 60 is provided in fluid communication with the outlet of the hydraulic pump 50 to guard against over pressurization of the main passage 54. Likewise, a pressure relief valve 62 is provided in fluid communication with the outlet of the electrically controlled hydraulic pump 56 to guard against over pressurization of the main passage 54. The pressure relief valves 60 and 62 will exhaust fluid though a passage 64 should an over pressurized condition manifest itself within the main passage 54. The main passage 54 is in fluid communication with an electronic transmission range selection (ETRS) valve 66, a line regulator valve 65, a dog clutch relay valve 68, an actuator feed regulator valve 70, a damper lock-out clutch trim valve 72, a trim valve 74, a trim valve 76, and a trim valve 78.

Figure 3A:
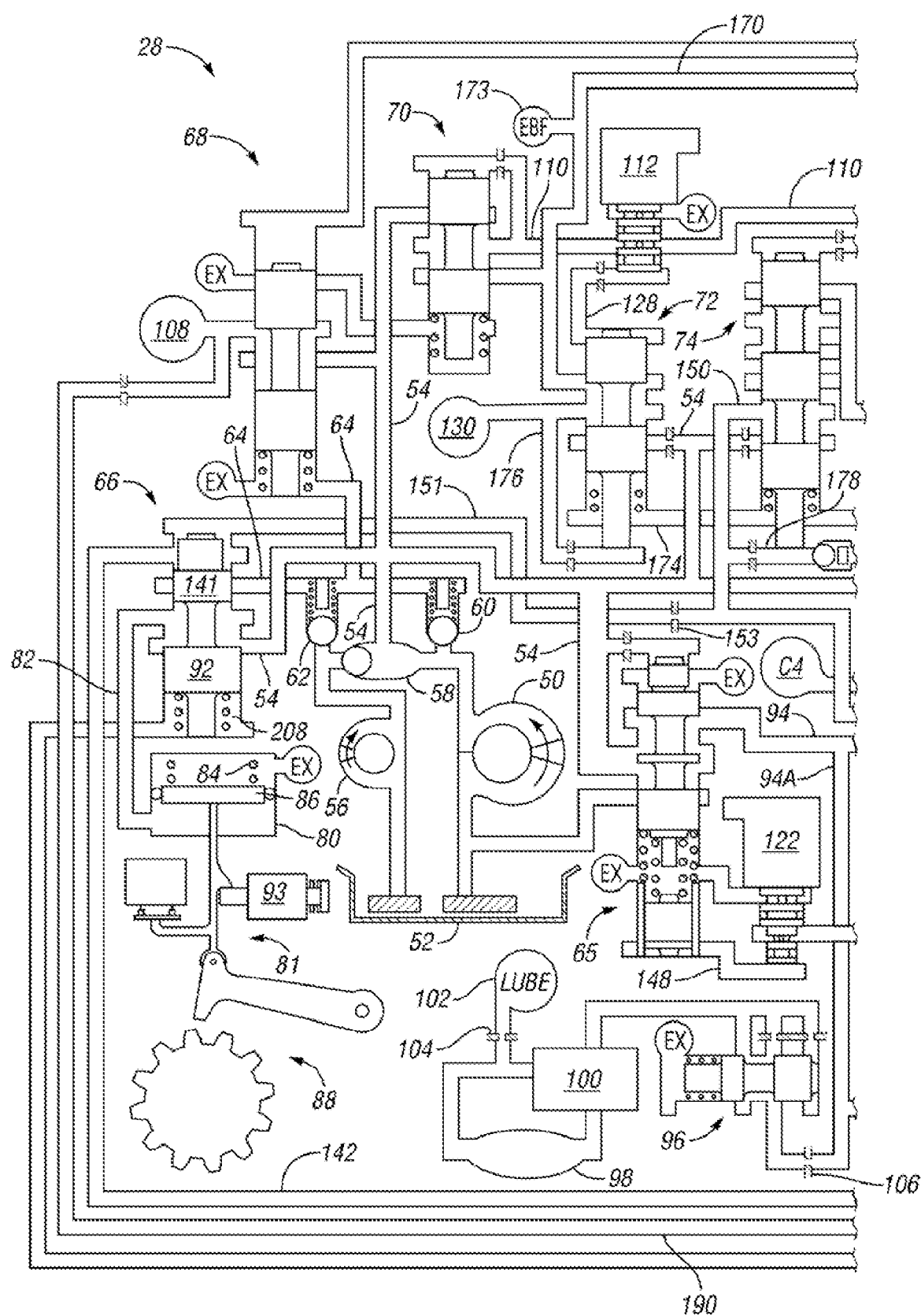
FIGS. 3a and 3b, taken together, is a schematic representation describing the electro-hydraulic control system utilized with the powertrain of FIG. 1, depicting the control system in an electrical power ON, out-of-park, series electrically variable transmission mode of operation.

The ETRS valve 66 operates to selectively communicate pressurized fluid from the main passage 54 to an actuator 80 of a park-by-wire subsystem 81 via a passage 82. The park-by-wire subsystem 81 is internally contained within the transmission 14 of FIG. 1. When the ETRS valve 66 is in the pressure set position, the pressurized fluid within the main passage 54 will be introduced to the actuator 80 via the passage 82. When the fluid pressure within the actuator 80 is sufficient to overcome the bias of a spring 84, a piston 86, interconnected with a park pawl mechanism 88, will move within the actuator 80 thereby disengaging the park pawl mechanism 88, as shown in FIG. 3a. When the ETRS valve 66 is in the spring set position, shown in FIG. 2a, a land 92 will block the flow of pressurized fluid from the main passage 54, and the passage 82 will exhaust through passage 64. The spring 84 operates to bias the piston 86 to effect engagement of the park pawl mechanism 88. A latching solenoid 93 is operable to maintain the park pawl mechanism 88 of the park-by-wire subsystem 81 in the out-of-park condition, as shown in FIG. 3a, in the absence of hydraulic pressure to the actuator 80. The park-by-wire subsystem 81 will be discussed in greater detail hereinbelow with reference to FIGS. 4 through 8.

The line regulator valve 65 establishes the pressure within the main passage 54, and when that pressure is satisfied, fluid is delivered through a passage 94, which subsequently splits to a passage 94A and a passage 94B. The passage 94A delivers pressurized fluid to a cooler regulator valve 96. Upon exiting the cooler regulator valve 96, the fluid passes into a cooler 98 and/or a cooler bypass valve 100. The cooler bypass valve 100 is operable to provide fluid flow in the event that fluid passage through the cooler 98 is blocked. The fluid from the cooler 98 and/or cooler bypass valve 100 is then distributed to a lubrication system 102 of the electrically variable hybrid transmission 14. An orifice 104 and an orifice 106 may be provided for fluid flow control purposes.

The dog clutch relay valve 68 operates to selectively provide pressurized fluid from the main passage 54 to a dog clutch 108. The dog clutch 108 is a spring engaged clutch and is disengaged with the application of fluid pressure. The electrically variable hybrid transmission 14 employs the dog clutch 108 to selectively switch between a parallel reverse mode, wherein the dog clutch 108 is engaged, and a series reverse mode, wherein the dog clutch 108 is disengaged. When the dog clutch relay valve 68 is in a spring set position, shown in FIG. 2a, the pressurized fluid within the dog clutch 108 will exhaust allowing the dog clutch 108 to engage. Alternately, when the dog clutch relay valve 68 is in a pressure set position, as shown in FIG. 3a, the dog clutch 108 will disengage in response to pressurized fluid within the main passage 54.

The actuator feed regulator valve 70 reduces the pressure within the main passage 54 to a control pressure in passage 110. The fluid within passage 110 is communicated to a plurality of solenoid valves 112, 114, 116, 118, 120, 122, 124, and 126. The solenoid valves 124 and 126 are on/off type solenoid valves, while the solenoid valves 112, 114, 116, 118, 120, and 122 are variable pressure type solenoid valves. The solenoid valves 116, 118, and 122 are normally high or normally open type solenoid valves, while the remaining solenoid valves 112, 114, 120, 124, and 126 are normally low or normally closed type solenoid valves. A normally open solenoid valve will distribute pressurized fluid or an output pressure in the absence of an electrical signal to the solenoid.

The solenoid valve 112 is operable to provide an output pressure in passage 128 that controls the bias pressure or control pressure on the damper lock-out clutch trim valve 72. The damper lock-out clutch trim valve 72 is operable to selectively engage a damper lock-out clutch 130 when transitioning into and out of the electric mode of operation.

Figure 3B:
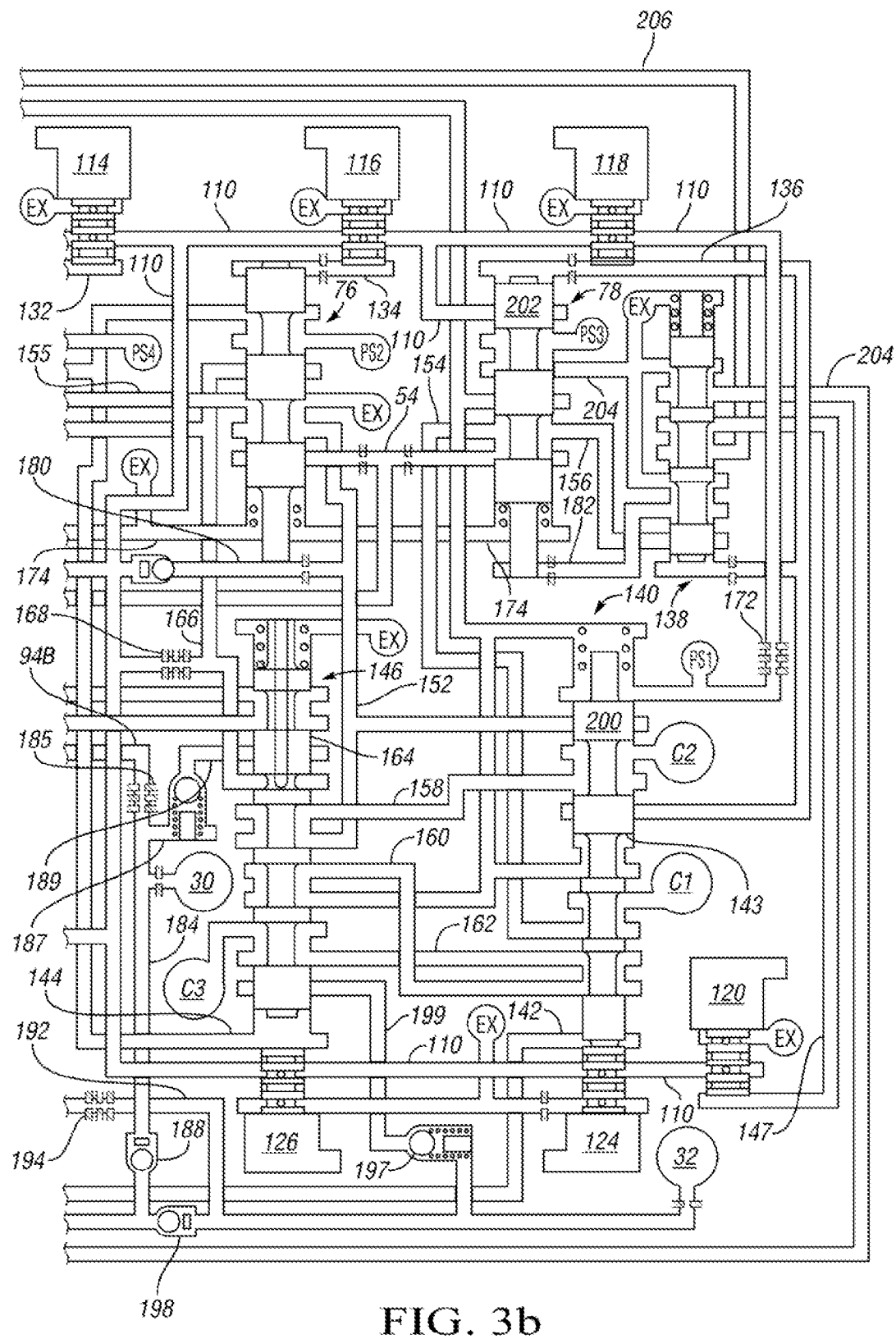

The solenoid valve 114 is operable to provide an output pressure in passage 132 that controls the bias pressure on the trim valve 74. The solenoid valve 116 is operable to provide an output pressure in passage 134 that controls the pressure bias on the trim valve 76. The solenoid valve 118 is operable to provide an output pressure in passage 136 that controls the pressure bias on the trim valve 78. Additionally, the output pressure in passage 136 controls the pressure bias on a boost or multiplex valve 138 and is further communicated to a logic valve 140. With the output passage 136 pressurized, the boost valve 138 is biased to a pressure set position, as shown in FIG. 3b. Alternately, with the output passage 136 exhausted, the boost valve 138 will move to a spring set position, as shown in FIG. 2b. The trim valves 72, 74, 76, and 78 are selectively biased into a second position or a pressure set position by fluid pressure within their respective passages 128, 132, 134, and 136. When the passages 128, 132, 134, and 136 exhaust, the respective trim valves 72, 74, 76, and 78 move to a first position or a spring set position. Additionally, the trim valves 72, 74, 76, and 78 have a trim or pressure regulation position.

The solenoid valve 120 is operable to selectively provide an output pressure in passage 147 that communicates pressurized fluid to the boost valve 138. The solenoid valve 122 is operable to provide an output pressure in passage 148 that controls pressure bias to the line regulator valve 65. The solenoid valve 122, by modulating the fluid pressure within passage 148, is operable to vary the operating characteristics of the line regulator valve 65 thereby modulating the pressure value within the main passage 54 for torque based pressure control.

The solenoid valve 124 is operable to provide an output pressure in passage 142 that controls the pressure bias on the logic valve 140. Additionally, the output pressure in passage 142 communicates pressurized fluid to the ETRS valve 66 and is operable to selectively bias the ETRS valve 66 into a pressure set position by engaging a land 141. The logic valve 140 has a differential area 143 operable to latch the logic valve 140 in a pressure set position when the torque transmitting mechanism C2 is engaged and electrical power to the solenoid valve 124 is interrupted. Pressurized fluid within passage 136 provides the differential area 143 with the force necessary to bias the logic valve 140 in a pressure set position. The solenoid valve 126 is operable to provide an output pressure in passage 144 that controls the pressure bias on a logic valve 146. The output pressure in passage 144 is also communicated to the trim valve 74 and the trim valve 76. The logic valves 140 and 146 each have a first position or a spring set position, and a second position or a pressure set position.

The logic valves 140 and 146 multiplex the trim valves 74, 76, and 78 to provide control to the four torque transmitting mechanisms C1, C2, C3, and C4. The logic valve 140 selectively communicates pressurized fluid to control the engagement of the torque transmitting mechanisms C1 and C2. While the logic valve 146 selectively communicates pressurized fluid to control the engagement of the torque transmitting mechanisms C3 and C4. The multiplexed trim valve configuration also provides control of fluid flow to effect cooling of the motor/generator A 30 and motor/generator B 32.

The trim valve 74 selectively communicates pressurized fluid through an outlet passage 150 to the logic valve 146. The outlet passage 150 communicates pressurized fluid to a passage 151 through a flow control orifice 153. The passage 151 is operable to provide pressurized fluid to bias the ETRS valve 66 into the pressure set position. The trim valve 76 selectively communicates pressurized fluid through an outlet passage 152 to both logic valves 140 and 146. A passage 155 is in selective fluid communication with the trim valves 74 and 76. The passage 155 is operable to exhaust the passage 150 when the trim valve 74 is in the spring set position. The passage 155 exhausts the passage 152 when the trim valve 76 is in the spring set position. An outlet passage 154 of the trim valve 78 selectively communicates pressurized fluid to the logic valve 140. Additionally, the trim valve 78 selectively communicates pressurized fluid to the boost valve 138 through an outlet passage 156. The logic valves 140 and 146 are in selective fluid communication with one another through passages 158, 160, and 162. A passage 164 is provided internally within the logic valve 146 and is operable to exhaust fluid within passage 158 when the logic valve 146 is in the spring set position. Alternately, when the logic valve 146 is in the pressure set position, the passage 164 is operable to exhaust a passage 166. The passage 166 is in fluid communication with the logic valve 146 and the trim valves 74 and 76. In addition, the passage 166 communicates with passage 110 through a series of flow restricting orifices 168.

A backfill passage 170 is in fluid communication with the actuator feed regulator valve 70, the damper lock-out clutch trim valve 72, the trim valve 78, the logic valve 140, and the logic valve 146. The actuator feed fluid pressure within passage 110 bleeds fluid to the backfill passage 170 through a series of flow restricting orifices 172. The fluid pressure within the backfill passage 170 is maintained at a value of approximately two pounds per square inch (psi) by an exhaust backfill pressure relief valve 173 to prevent air from entering the electro-hydraulic control system 28.

An exhaust passage 174 is in communication with the damper lock-out clutch trim valve 72 and the trim valves 74, 76, and 78. A feedback passage 176 is operable to provide a force balance when the damper lock-out trim valve is in a regulation or trim position. Likewise, a feedback passage 178 is operable to provide a force balance when the trim valve 74 is in a trim position. A feedback passage 180 is operable to provide a force balance when the trim valve 76 is in a trim position. A feedback passage 182 is operable to provide a force balance when the trim valve 78 is in the trim position and the boost valve 138 is in the spring set position. Alternately, when the boost valve 138 is in the pressure set position, the feedback passage 182 is exhausted through the passage 205.

The passage 94B communicates fluid to a passage 184 though a series of flow restricting orifices 185. By pressurizing passage 184, the motor/generator A 30 is provided with a measured amount of fluid for cooling. A one-way check valve 188 is provided such that the pressurized fluid within the passage 184 is prevented from entering passage 190. A spring return check ball 187 is operable to provide additional fluid flow to the motor/generator A 30 when a passage 189 is pressurized. The passage 94A communicates fluid to a passage 192 though a series of flow restricting orifices 194. By pressurizing passage 192, the motor/generator B 32 is provided with a measured amount of cooling fluid. A one-way check valve 198 is provided such that the pressurized fluid within the passage 192 is prevented from entering passage 190. A spring return check ball 197 is operable to provide additional fluid flow to cool the motor/generator B 32 when a passage 199 is pressurized.

Four pressure sensitive switches or pressure switches PS1, PS2, PS3, and PS4 are provided for position detection of the trim valves 74, 76, and 78 and the logic valves 140 and 146. The ability to monitor the above mentioned valves and detect any change, or lack of change, in valve state is of importance in order to provide continuous and reliable operation of the electrically variable hybrid transmission 14.

The electro-hydraulic control system 28 is capable of detecting state changes of the trim valves 74, 76, and 78 and the logic valves 140 and 146 by multiplexing the four pressure switches PS1, PS2, PS3, and PS4. The pressure switches PS1, PS2, PS3, and PS4 are disposed in selective fluid communication with the logic valve 140 and the trim valves 76, 78, and 74, respectively. Traditionally, five pressure switches, one switch for each valve, would have been used to determine trim valve state changes.

Detection of a state change, or failure to change, of the logic valve 140 is accomplished through stand-alone detection using the pressure switch PSI. With the logic valve 140 in the spring set position, the pressure switch PSI will exhaust to the backfill passage 170. When the logic valve 140 moves to a pressure set position, a land 200 will block the pressure switch PSI from exhausting to passage 170. Instead, the passage 110 will communicate pressurized fluid to the pressure switch PSI through orifices 172. Detection of a state change, or failure to change, of the trim valve 78 is accomplished through stand-alone detection using the pressure switch PS3. With the trim valve 78 in the spring set position, the passage 110 will communicate pressurized fluid to the pressure switch PS1. When the trim valve 78 moves to a pressure set position, a land 202 will block the passage 110 thereby allowing the pressure switch PS3 to exhaust via passage 205.

Detection of a state change or failure to change, of the logic valve 146 and the trim valves 76 and 74 is achieved by multiplexing the pressure switches PS2 and PS4. To achieve this, passage 166 is disposed in fluid communication with the trim valves 74 and 76 and the logic valve 146. Additionally, the passage 144 is disposed in fluid communication with the trim valves 74 and 76 and the logic valve 146. The passages 166 and 144 are selectively pressurized based on the position of the logic valve 146. When the logic valve 146 is in the spring set position, the passage 166 is pressurized with fluid from passage 110 through orifices 168. Alternately, when the logic valve 146 is in the pressure set position, the passage 164 within the logic valve 146 will exhaust the fluid within the passage 166. When the solenoid valve 126 is energized, the logic valve 146 moves to a pressure set position and the passage 144 will pressurize. Alternately, when the solenoid valve 126 is de-energized, the logic valve 146 will move to a spring set position and the passage 144 will exhaust.

The multiplexed pressure switch arrangement provides a reversal in states of pressurization between the passage 166 and 144. For example, if the logic valve 146 is in the pressure set position, the passage 144 will be pressurized and the passage 166 will exhaust. Alternately, if the logic valve 146 is in the spring set position, the passage 166 will be pressurized and the passage 144 will be exhausted. This event will be indicated through a change in logic state of both of the pressure switches PS2 and PS4 irrespective of the position of their respective trim valves 76 and 74.

The boost valve 138 operates as a multiplex valve in the present invention. The solenoid valve 120 selectively pressurizes passage 147, which is in fluid communication with the boost valve 138. The boost valve operates to selectively direct the pressurized fluid to one of a passage 204 and a passage 206. The passage 204 is operable to communicate pressurized fluid to a spring pocket 208 of the ETRS valve 66. The passage 206 is operable to communicate pressurized fluid to bias the dog clutch relay valve 68 into a pressure set position. When in the spring set position, the boost valve 138 will direct pressurized fluid within passage 147 into passage 204 enabling control of the ETRS valve 66. When in the pressure set position, the boost valve 138 will direct pressurized fluid within the passage 147 into passage 206 enabling control of the dog clutch relay valve 68.

When a park condition, as shown in FIGS. 2a and 2b, is commanded the solenoid valve 120 will pressurize the passage 204, via the passage 147, thereby pressurizing the spring pocket 208 of the ETRS valve 66. The pressurized fluid within the spring pocket 208 will de-latch the ETRS valve and move it into the spring set position, as shown in FIG. 2a. With the ETRS valve 66 in the spring set position, the flow of pressurized fluid within the main passage 54 to passage 82 is blocked by the land 92. The passage 82 will exhaust through passage 64 allowing the spring 84 to bias the piston 86 of the actuator 80. With the actuator 80 in the spring biased position, the park pawl mechanism 88 is engaged.

When disengagement of the park pawl mechanism 88 is desired, the fluid pressure within the passage 204 is exhausted via solenoid valve 120. The ETRS valve may then be placed in the pressure set position in one of two ways. The trim valve 74 may selectively bias the ETRS valve 66 into a pressure set position by pressurizing the passage 151 via passage 150. The trim valve 74 must be in the trim or pressure set position to control the ETRS valve 66. Additionally, the solenoid valve 124 may selectively pressurize the passage 142 causing fluid pressure to act on the differential area formed on the land 141. Once pressure within passage 151 and/or passage 142 is of a large enough magnitude to overcome the spring bias of the ETRS valve 66, the ETRS valve 66 will move to a pressure set position, as shown in FIG. 3a. The ETRS valve 66 will remain latched in the pressure set position by the pressurized fluid within the main passage 54, until de-latched by increasing the pressure within the spring pocket 208 via passage 204. The pressurized fluid within the main passage 54 will pressurize the passage 82, thereby biasing the piston 86 of the actuator 80 against the force of the spring 84. With the actuator 80 in the pressure set position, as shown in FIG. 3a, the park pawl mechanism 88 will disengage.

The electro-hydraulic control system 28 shown in FIGS. 2a through 3b enable two modes of reverse operation. The parallel reverse mode employs the torque transmitting mechanism C1 and the electrical power units 30 and 32 to effect movement of the vehicle. A series reverse mode employs the torque transmitting mechanisms C1 and C4 to effect movement the vehicle. The series reverse mode requires the dog clutch 108 to be disengaged. The dog clutch 108 of the present invention is spring engaged; therefore, selectively pressurizing the dog clutch 108 with fluid will effect disengagement. In all modes of operation, other than the series reverse mode, the dog clutch 108 will remain engaged.

FIGS. 3a and 3b illustrate the electro-hydraulic control system 28 in series reverse mode of operation. In this mode, the boost valve 138 is placed in the pressure set position enabling the solenoid valve 120 to selectively pressurize the passage 206. The fluid pressure within the passage 206 will operate to bias the dog clutch relay valve 68 into a pressure set position. With the dog clutch relay valve 68 in a pressure set position, the pressurized fluid within the main passage 54 is communicated to the dog clutch 108 to effect disengagement. Additionally, pressurized fluid is communicated to the passage 190 to increase fluid flow to cool the motor/generator A 30 and the motor/generator B 32. When the dog clutch relay valve 68 returns to a spring set position, by exhausting the passage 206, the pressurized fluid within the dog clutch 108 will exhaust and the dog clutch 108 will engage. The passage 206 may be exhausted by the solenoid valve 120 (if the boost valve 138 remains in the pressure set position) or by placing the boost valve 138 in the spring set position.

The boost valve 138 is placed in the pressure set position for the electrically variable low mode of operation, first forward range, and second forward range transmission operating modes. Therefore, the solenoid valve is operable to control the dog clutch relay valve 68. For the third forward range, fourth forward range, and electrically variable high mode, the boost valve 138 is in the spring set position enabling the solenoid valve 120 to control the ETRS valve 66. However, in all of the aforementioned modes of operation the solenoid valve 120 will be commanded off.

Figure 4:
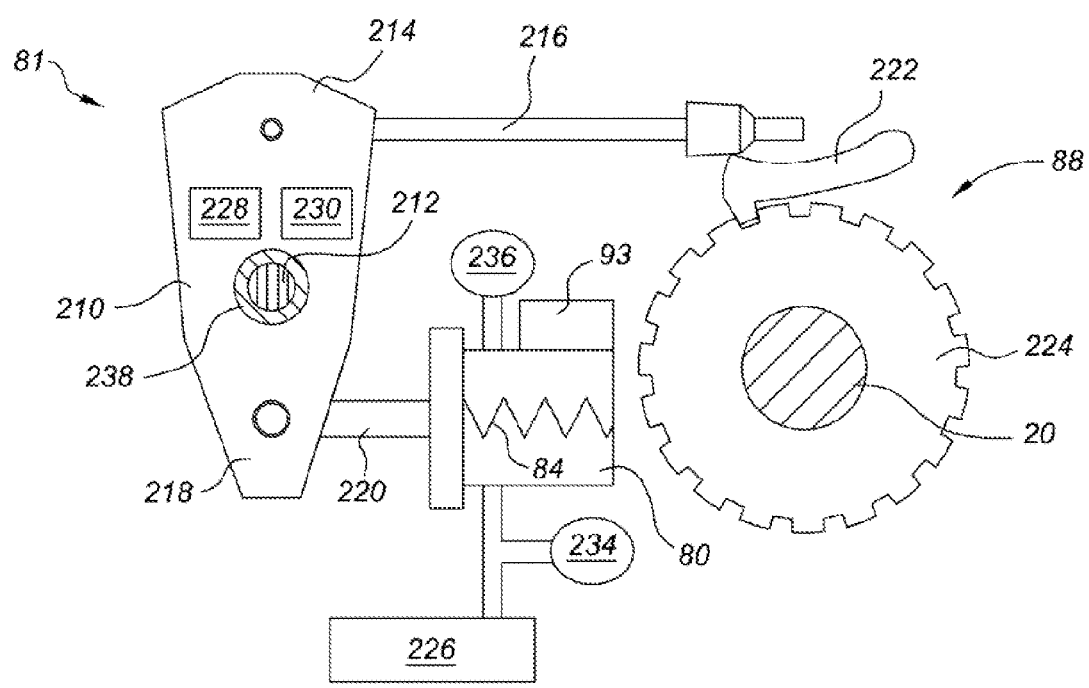
FIG. 4 is a schematic illustration of a park-by-wire subsystem for use with the control system of FIGS. 2a, 2b, 3a, and 3b, illustrating the park-by-wire subsystem in a park condition or mode.
Figure 5:
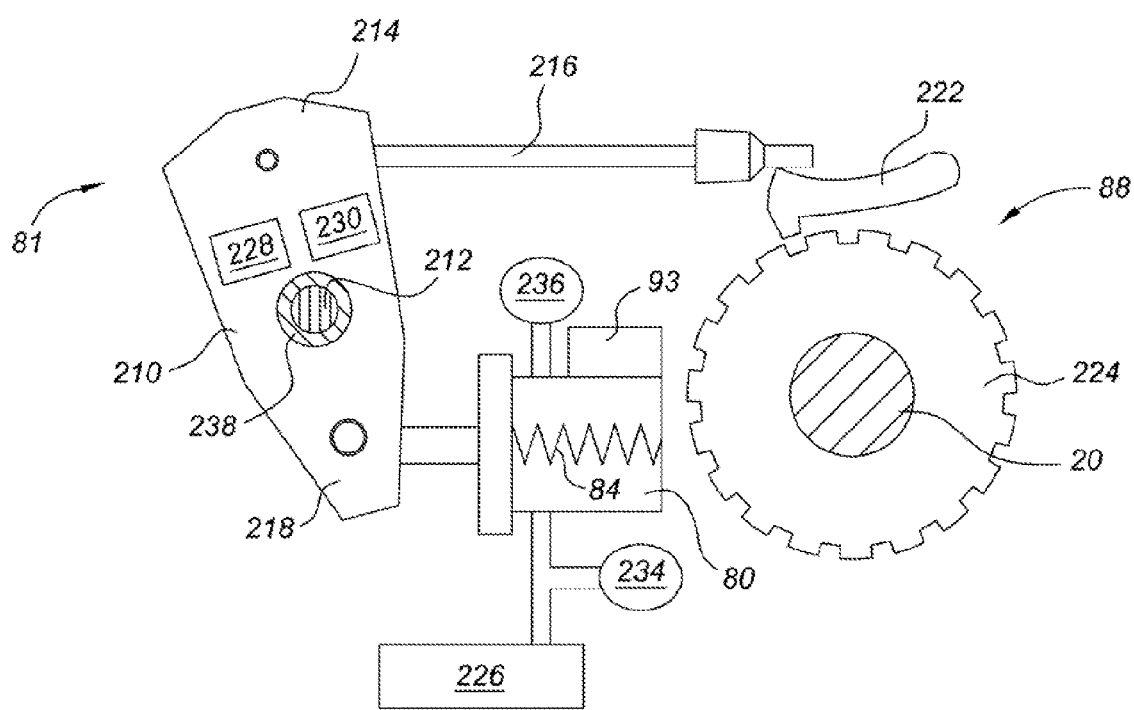
FIG. 5 is a schematic illustration of the park-by-wire subsystem of FIG. 4 illustrating the park-by-wire subsystem in an out-of-park condition or mode.

Referring now to FIGS. 4 and 5, the park-by-wire subsystem 81 is schematically depicted in greater detail. The park-by-wire subsystem 81 includes a lever 210 rotatably mounted upon a shaft 212. The lever 210 includes a first end 214, having an actuator rod 216 mounted thereto, and a second end 218 mounted to a link 220. The actuator rod 216 is operable to selectively engage the park pawl mechanism 88. The park pawl mechanism 88 includes a park pawl arm 222 and a gear 224. The gear 224 is typically mounted to, or formed integrally with, the output shaft 20 of FIG. 1. The park pawl mechanism 88 is in a park mode or condition when the park pawl arm 222 is in engagement with the gear 224, as shown in FIG. 4, and in an out-of-park mode or condition when the park pawl arm 222 is out of engagement with the gear 224, as shown in FIG. 5.

The actuator 80 is operable to bias the lever 210 via the link 220 in response to command signals from a command source 226, such as the ERTS valve 66 of FIGS. 2a and 3a. The latching solenoid 93 is operable to maintain the position of the lever 210 such that the park pawl mechanism 88 is retained in the out-of-park position in the absence of command signals from the command source 226. First and second Hall effect switches 228 and 230, respectively, cooperate with the lever 210 to signal the rotational position of the lever 210. Spring 84 is provided within the actuator 80 and is operable to bias the link 220 in the absence of a command signal from the command source 226. A switch 234 is provided to monitor command signals from the command source 226 to the actuator 80, while a sensor 236 is provided to monitor the performance of the actuator 80.

With the park-by-wire subsystem 81 in the park condition, as shown in FIG. 4, no command signals are provided by the command source 226 such that the spring 84 biases the link 220 leftward, as viewed in FIG. 4, such that the lever 210 is biased in a clockwise direction. As a result, the lever 210 urges the actuator rod 216 rightward to bias the park pawl arm 222 into engagement with the gear 224, thereby placing the park pawl mechanism 88 in the park condition. The first and second Hall effect switches 228 and 230 signal that the lever 210 is in the park position.

With the park-by-wire subsystem 81 in the out-of-park condition, as shown in FIG. 5, command signals are provided by the command source 226 such that the actuator 80 biases the link 220 rightward, as viewed in FIG. 5, such that the lever 210 is biased in a clockwise direction. As a result, the lever 210 biases the actuator rod 216 leftward to allow the park pawl arm 222 to disengage the gear 224, thereby placing the park pawl mechanism 88 in the out-of-park condition. The first and second Hall effect switches 228 and 230 signal that the lever 210 is in the out-of-park position. With the park-by-wire subsystem 81 in the out-of-park condition, the latching solenoid 93 may be engaged to maintain the park pawl mechanism 88 in the out-of-park condition. A torsion spring 238 may be provide in conjunction with, or in lieu of, the spring 84 such that the lever 210 is biased into the park position in the absence of a control signal from the command source 226.

Figure 6:
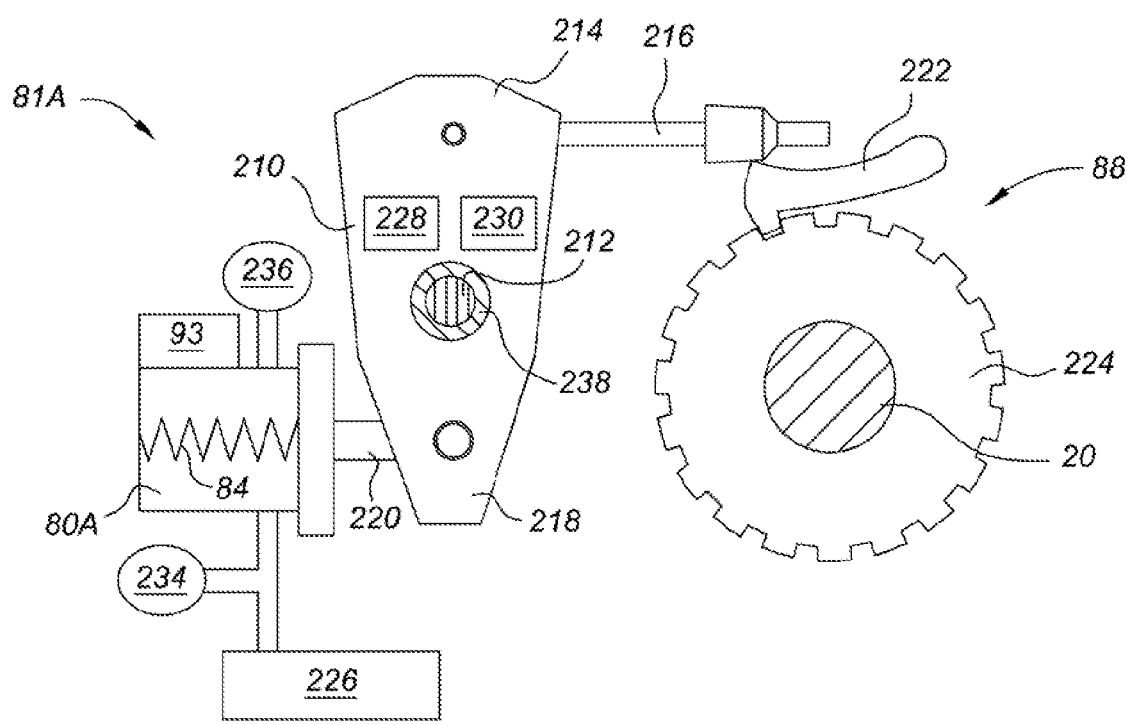
FIG. 6 is a schematic illustration of an alternate embodiment of the park-by-wire subsystem of FIGS. 4 and 5, illustrating the park-by-wire subsystem in a park condition or mode.
Figure 7:
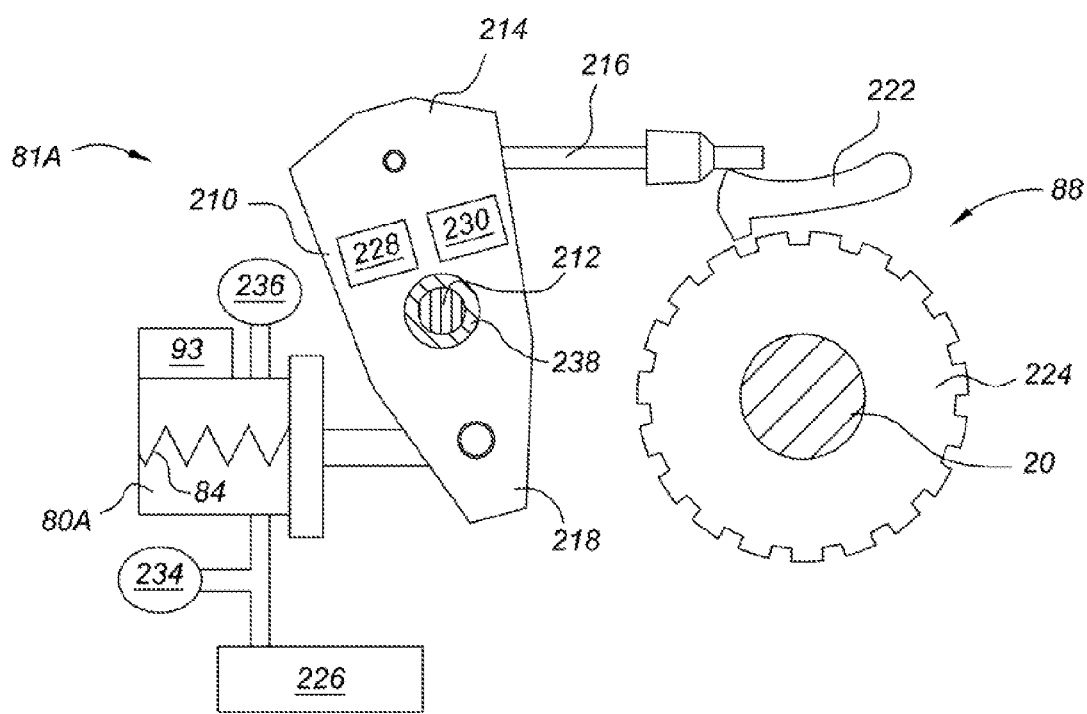
FIG. 7 is a schematic illustration of the park-by-wire subsystem of FIG. 6 illustrating the park-by-wire subsystem in an out-of-park condition or mode.

Referring to FIGS. 6 and 7 there is shown an alternate embodiment of the park-by-wire subsystem 81 of FIGS. 4 and 5 generally indicated at 81A. The park-by-wire subsystem 81A is similar in operation and construction to that of park-by-wire subsystem 81. However, the park-by-wire subsystem 81A includes actuator 80A which is operable to bias the link 220 leftward, as viewed in FIG. 6, to effect clockwise rotation of the lever 210. In so doing, the actuator rod 216 is biased rightward into engagement with the park pawl arm 220 to place the park pawl mechanism 88 in the park condition. Alternately, in response to command signals provided by the command source 226, the actuator 80A biases the link 220 rightward, as viewed in FIG. 7, such that the lever 210 is biased in a counter-clockwise direction. As a result, the lever 210 biases the actuator rod 216 leftward to allow the park pawl arm 222 to disengage the gear 224, thereby placing the park pawl mechanism 88 in the out-of-park condition. The lever 210 may be characterized as a "lost motion" lever in that the lever 210 may be manually rotated, through external force, into the out-of-park position, irrespective of the force exerted by the actuator 80 or 80A, thereby allowing the link 220 to translate with respect to the lever 210.

Figure 8:
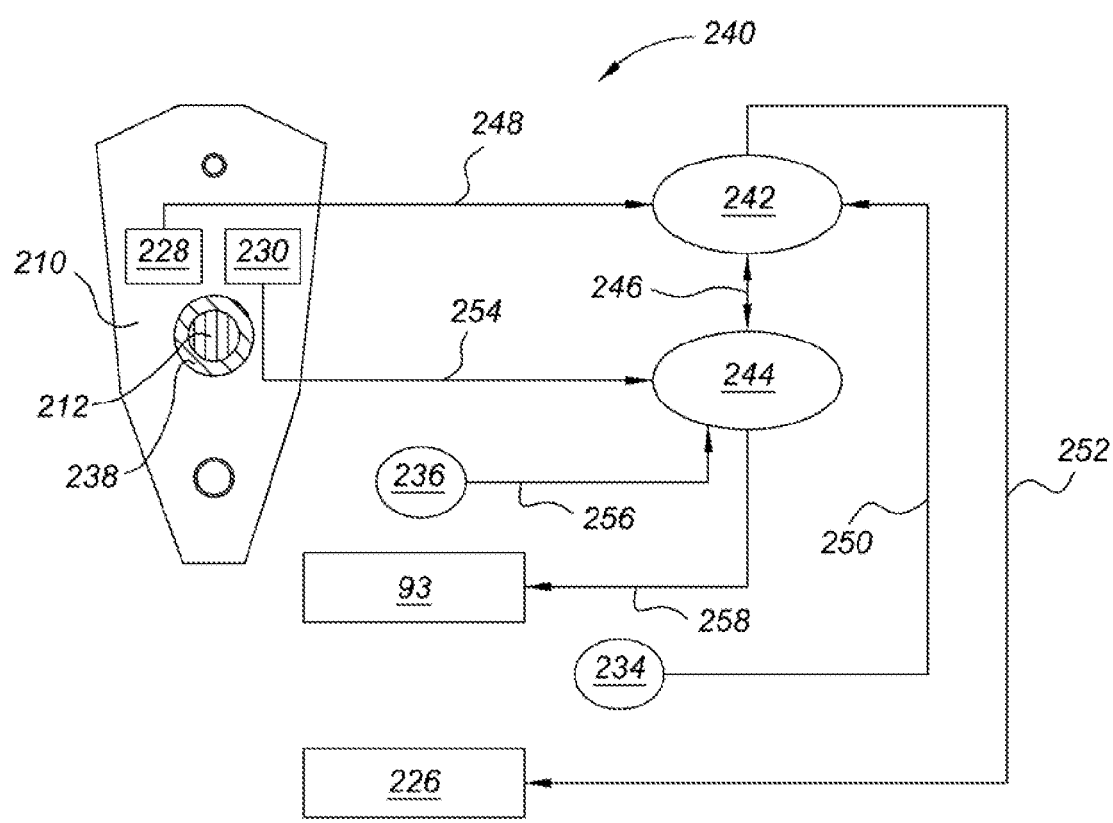
FIG. 8 is a schematic diagrammatic illustration of a control system to enable operation of the park-by-wire subsystems of FIGS. 4 through 7.

Referring now to FIG. 8 there is shown a schematic diagrammatic illustration of a control system 240 configured to control the park-by-wire subsystem 81 of FIGS. 4 and 5 and the park-by-wire subsystem 81A of FIGS. 6 and 7. The control system 240 includes a first control unit 242 and a second control unit 244. Each of the first and second control units 242 and 244 may be incorporated within the control unit 34 of FIG. 1, or may be separate. The first and second control units 242 and 244 communicate with each other over line 246. The second control unit 244 is incorporated into the control system 240 for control, monitoring, and diagnostic redundancies. The first and second control units 242 and 244 cooperate to provide control, monitoring, and diagnostic functions for the park-by-wire subsystem 81 or 81A. The first control unit 242 receives signals from the first Hall effect switch 228 over line 248 to monitor the position of the lever 210. Additionally, the first control unit 242 receives signals from the switch 234 over line 250 to monitor the command signals provided to the actuator 80 or 80A, shown in FIGS. 4 through 5 and 6 through 7, respectively, by the command source 226. The first control unit 242 is operable to control the command source 226 via line 252. As such the switch 234 provides a feedback signal over line 250 to the first control unit 242.

The second control unit 244 receives signals from the second Hall effect switch 230 over line 254 to monitor the position of the lever 210. Additionally, the sensor 236 provides signals over line 256 to the second control unit 244, such that the operation of the actuator 80 or 80A may be monitored. The second control unit 244 is operable to provide command signals over line 258 to control operation of the latching solenoid 93.

While the discussion hereinabove has focused on an actuator 80 and 80A that is hydraulically actuated (i.e. a hydraulic servo), an electrically actuated actuator, such as a motor, may be employed while remaining within the scope of that which is claimed. In such a case, a current monitoring device would be employed as the switch 234 and a displacement monitoring device would be employed as the sensor 236. Furthermore the actuator 80 or 80A may be a two-way or dual acting actuator operable to bias the lever 210 both into and out of the park position thereby obviating the need for the spring 84 and/or torsion spring 238.

While the best modes for carrying out the invention have been described in detail, those familiar with the art to which this invention relates will recognize various alternative designs and embodiments for practicing the invention within the scope of the appended claims.

The invention claimed is:

1. A park-by-wire subsystem for an electrically variable hybrid transmission comprising:
    a command source;
    an actuator responsive to control signals from said command source;
    a lever operatively connected to said actuator;
    a park pawl mechanism operatively connected to said lever;
    wherein said actuator is operable to engage said lever to selectively place said park pawl mechanism in one of a park and out-of-park condition;
    at least two control units;
    wherein a first of said at least two control units is operable to control said command source; and
    at least one switch configured to signal the position of said lever to at least one of said control units.

2. The park-by-wire subsystem of claim 1, further comprising:
    wherein said at least one switch includes first and second Hall effect switches; and
    wherein said first and second Hall effect switches are operable to signal the position of said lever to said first of said at least two control units and a second of said at least two control units, respectively.

3. The park-by-wire subsystem of claim 1, further comprising a switch operable to monitor said command source and communicate with said first of said at least two control units.

4. The park-by-wire subsystem of claim 1, further comprising a sensor operable to monitor said actuator and communicate with a second of said at least two control units.

5. The park-by-wire subsystem of claim 1, wherein said first and second of said at least two control units communicate with each other.

6. The park-by-wire subsystem of claim 1, wherein said park pawl mechanism includes:
   a gear operatively connected to an output shaft of the electrically variable hybrid transmission; and
   a park pawl arm selectively engageable with said gear to place said park pawl mechanism in said park condition.

7. The park-by-wire subsystem of claim 6, further comprising:
   an actuator rod operatively connected to said lever; and
   wherein said actuator rod is operable to selectively bias said park pawl arm into engagement with said gear.

8. The park-by-wire subsystem of claim 1, further comprising a latching solenoid operable to maintain said park pawl mechanism in the out-of-park condition in the absence of control signals from said command source.

9. The park-by-wire subsystem of claim 8, wherein a second of said at least two control units is operable to control said latching solenoid.

10. The park-by-wire subsystem of claim 1, further comprising a spring operable to bias said lever to place said park pawl mechanism in said park position.

11. The park-by-wire subsystem of claim 1, wherein said actuator is one of a motor and a hydraulic servo.

12. An electrically variable hybrid transmission comprising:
   a park-by-wire subsystem including:
      a command source;
      an actuator responsive to control signals from said command source;
      a lever operatively connected to said actuator;
      a park pawl mechanism operatively connected to said lever;
      wherein said actuator is operable to engage said lever to selectively place said park pawl mechanism in one of a park and out-of-park condition;
      first and second control units operable to communicate with each other;
      wherein said first control unit is operable to control said command source;
      a switch operable to monitor said command source and communicate with said first control unit; and
      a sensor operable to monitor said actuator and communicate with said second control unit.

13. The electrically variable hybrid transmission of claim 12, wherein said park-by-wire subsystem further includes first and second Hall effect switches and wherein said first Hall effect switch is operable to signal the position of said lever to said first control unit and wherein said second Hall effect switch is operable to signal the position of said lever to said second control unit.

14. The electrically variable hybrid transmission of claim 12, further comprising a latching solenoid operable to maintain said park pawl mechanism in the out-of-park condition in the absence of control signals from said command source and wherein said second control unit is operable to control said latching solenoid.

15. An internally mounted park-by-wire subsystem for an electrically variable hybrid transmission comprising:
   a command source;
   an actuator responsive to control from said command source;
   a lever operatively connected to said actuator;
   a park pawl mechanism operatively connected to said lever;
   wherein said actuator is operable to engage said lever to selectively place said park pawl mechanism in one of a park and out-of-park condition;
   first and second control units operable to communicate with each other;
   wherein said first control unit is operable to control said command source;
   a switch operable to monitor said command source and communicate with said first control unit;
   a sensor operable to monitor said actuator and communicate with said second control unit;
   first and second Hall effect switches;
   wherein said first Hall effect switch is operable to signal the position of said lever to said first control unit and wherein said second Hall effect switch is operable to signal the position of said lever to said second control unit; and
   a latching solenoid operable to maintain said park pawl mechanism in the out-of-park condition in the absence of control from said command source.

* * * * *